United States Patent [19]
Aebi et al.

[11] Patent Number: 5,518,190
[45] Date of Patent: May 21, 1996

[54] GRINDING UNIT FOR A COFFEE GRINDING APPARATUS

[75] Inventors: Thomas Aebi, Saland; André Ochsenbein, Russikon, both of Switzerland

[73] Assignee: Samaro Engineering and Handels AG, Wetzikon, Switzerland

[21] Appl. No.: 446,239

[22] Filed: May 22, 1996

[30] Foreign Application Priority Data

May 25, 1994 [DE] Germany ............... 44 18 139.6

[51] Int. Cl.⁶ .................. B02C 19/00; B02C 9/12
[52] U.S. Cl. ............... 241/32; 241/248; 241/260.1; 192/56.62
[58] Field of Search ............ 241/36, 37.5, 100, 241/248, 258, 260.1, 261.1, 32; 99/286; 464/38; 192/56.57, 56.62

[56] References Cited

U.S. PATENT DOCUMENTS

| 2,193,849 | 3/1940 | Whitfield | 241/32 |
| 2,212,883 | 8/1940 | Meeker et al. | 241/248 X |
| 2,763,440 | 9/1956 | Johnson | 241/248 X |
| 3,305,058 | 2/1967 | Orwin et al. | 192/56.57 |
| 3,429,350 | 2/1969 | Otto | 241/248 X |
| 3,943,729 | 3/1976 | Dankel | 241/32 X |
| 4,095,751 | 6/1978 | Artin | 241/37.5 |
| 4,263,996 | 4/1981 | Putney | 192/56.57 |
| 4,641,572 | 2/1987 | Varga | 99/286 |
| 4,962,693 | 10/1990 | Miwa et al. | 99/283 |

Primary Examiner—John Husar
Attorney, Agent, or Firm—Tarolli, Sundheim, Covell, Tummino & Szabo

[57] ABSTRACT

The grinding unit comprises a grinding rotor unit, incorporating a inlet screw member, a conical grinding tool member, a delivery dish member and a gear unit. A dog clutch is operationally inserted between the delivery dish member and the gear unit. A safety clutch is operationally inserted between delivery dish member and grinding tool which limits the torque to be transmitted. The safety clutch is provided with ball members located in axially running bores of the delivery dish member and being axially displaceable in these bores. The ball members are forced against the front face of the grinding tool and partially engage apertures provided therein under the influence of spring members assigned to each ball member. The delivery dish member is provided at its surface which faces the grinding tool member with a metallic disc member in which are located the mouths of axial bores containing the spring pressure loaded ball members. The dog clutch comprises a plurality of elastic dampening members inserted between the claw members of the dog clutch.

6 Claims, 2 Drawing Sheets

GRINDING UNIT FOR A COFFEE GRINDING APPARATUS

FIELD OF THE INVENTION

The present invention refers to a grinding unit for a coffee grinding apparatus, particularly for the use in a coffee brewing machine.

The grinding unit comprises a conically shaped grinding tool member and a grinding collar member whereby the grinding tool member is rotatably mounted in the interior of the grounding collar member to form a grinding unit, for instance to grind coffee beans.

The grinding unit further comprises a driving means incorporating a gear means for driving the grinding tool member to a rotational movement around a vertically running axis, and a delivery dish member axially connected to the grinding tool member and to the gear means.

For transmitting the driving force, a dog clutch is operationally inserted between the gear means and the delivery dish member, and a safety clutch is operationally inserted between the delivery dish member and the grinding tool member to limit the amount of torque transmitted between the delivery dish member and the grinding tool member.

The safety clutch member comprises a plurality of ball members located in axial bores provided in the delivery dish member. The ball members are under the pressure of springs. The ball members partially engage apertures provided in the front face of the grinding tool member.

PRIOR ART

Grinding units of this kind usually consist of plastic materials. Particularly, the housing elements and all the movable parts thereof are manufactured of plastic material, except the axes and shafts.

During the operation of the grinding unit, it may happen that it is overstrained, for example, if the material to be ground, e.g. coffee beans, contains particles of hard mineralic material, e.g. sand particles or small stones. If such strange material comes into the space between grinding tool and grinding collar, the grinding unit can be blocked. In such a case, the safety clutch member comes into operation in order to release excessive strain from the driving means for the grinding unit.

However, before the safety clutch is completely released, the impact force occurring during a sudden stop of the grinding unit can have a damaging effect on all elements which contribute to the transmission of the torque under the influence of the mass which is still further driven by the drive means of the grinding unit. Moreover, experiments have shown that the impact force can occur periodically several times, may be in an attenuated form, until the drive means has stopped, particularly each time when the safety clutch engages again.

In coffee machines in which the grinding unit preferably is used, the grinding process is timely limited, e.g. to a period of 10 to 20 seconds; nevertheless, the grinding unit can be seriously damaged if a condition as discussed herein before occurs, particularly, if such an abnormal situation occurs at the beginning of the grinding cycle.

Due to a strain situation of the kind discussed herein before, first and foremost the plastic gear wheels of the gear unit are seriously damaged; sometimes, even individual teeth of the gear wheels can break. Moreover, the mouths of the bores provided in the delivery dish member and receiving the ball members of the safety clutch can be seriously damaged under the influence of the excessive forces and the thereby resulting friction heat, with the result that they are distorted in such a way that a correct operation of the safety clutch is no longer ensured. The experience has shown that in the case if such problems, i.e. if strange material comes into the grinding unit, occur from time to time, a very rapid wear of important parts of the grinding drive unit takes place; thus, the grinding unit must be replaced frequently.

OBJECTS OF THE INVENTION

It is an object of the invention to provide a grinding unit for a coffee grinding apparatus, particularly for the use in a coffee brewing machine, of the kind mentioned herein before which is improved in such a way that such overstrain situations have no or substantially less effect, in order to thereby avoid the above mentioned disadvantages and to prolong the useful life of the grinding unit.

SUMMARY OF THE INVENTION

In order to achieve these and other objects, the present invention provides a a grinding unit for a coffee grinding apparatus, particularly for the use in a coffee brewing machine, which comprises a conically shaped grinding tool member and a grinding collar member. The grinding tool member is rotatably mounted in the interior of the grounding collar member to form a grinding unit, for instance to grind coffee beans.

The grinding unit further comprises a driving means incorporating a gear means for driving the grinding tool member to a rotational movement around a vertically running axis, and a delivery dish member axially connected to the grinding tool member and to the gear means.

For transmitting the driving force, a dog clutch is operationally inserted between the gear means and the delivery dish member, and a safety clutch is operationally inserted between the delivery dish member and the grinding tool member to limit the amount of torque transmitted between the delivery dish member and the grinding tool member.

The safety clutch member comprises a plurality of ball members located in axial bores provided in the delivery dish member. The ball members are under the pressure of springs. The ball members partially engage apertures provided in the front face of the grinding tool member.

The delivery dish member and the gear means are made of plastic material, and the delivery dish member is provided at its surface which faces the grinding tool member with a metallic disc member in which are located the mouths of axial bores containing the spring pressure loaded ball members. The dog clutch comprises a plurality of elastic dampening members inserted between the claw members of the dog clutch.

By these measures, on the one hand, the safety of operation of the safety clutch is considerably increased, and, on the other hand, the influences of an excessive impact strain to the gear unit is attenuated.

Preferably, the gear unit is provided with a plurality of rib-like radial claws at that side which faces the delivery dish member, and each of the claws is provided with one of the elastic dampening members. Thereby, in such a design, the mounting of the dampening members is facilitated.

In a preferred embodiment of the apparatus according to the invention, the dampening members are constituted by annular sector shaped damper body members and are mounted such that the distance between two parallel end sides of adjacent damper body members delimit a gap in which a claw member of the delivery dish member matchingly engages.

BRIEF DESCRIPTION OF THE DRAWINGS

In the following, the coffee grinding apparatus according to the invention will be further described, with reference to the accompanying drawings, in which an embodiment of the essential parts of the grinding unit is shown. Particularly, in the drawings.

DETAILED DESCRIPTION OF A PREFERRED EMBODIMENT

Figure 1:
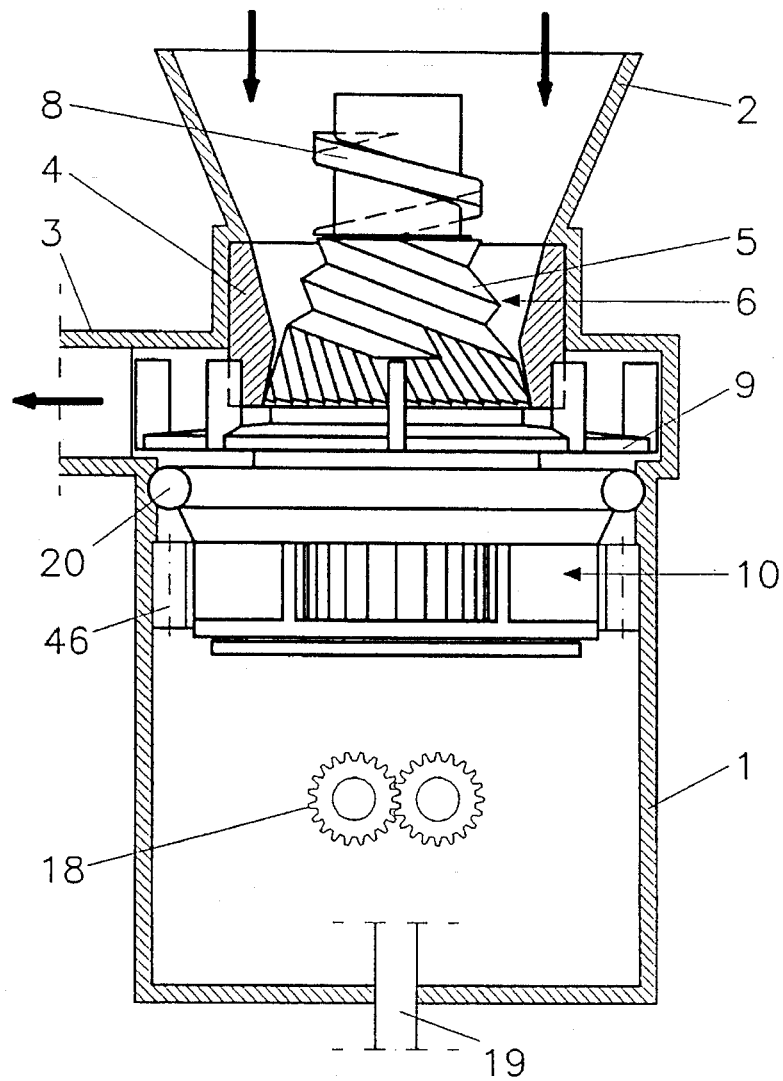
FIG. 1 shows a schematical longitudinal sectional view of a coffee grinding apparatus incorporating a grinding unit according to the invention.

According to FIG. 1, the coffee grinding apparatus has a just schematically shown housing 1, for example made of plastic material. The housing 1 is provided with an inlet funnel member 2 for receiving the coffee beans to be ground and an outlet flange member 3 for the ground coffee. Inserted into the housing 1 is a grinding collar 4 made of metallic material. In the interior of the metallic grinding collar 4, there is provided a grinding tool 5 having an essentially conical shape and being made of metallic material as well. The grinding tool 5 is intended to cooperate with the afore mentioned grinding collar 4 for grinding the coffee beans fed via the inlet funnel member 2 to the so formed grinding unit which is generally designated with reference numeral 6 and comprises a vertically running axis of rotation.

Figure 2:
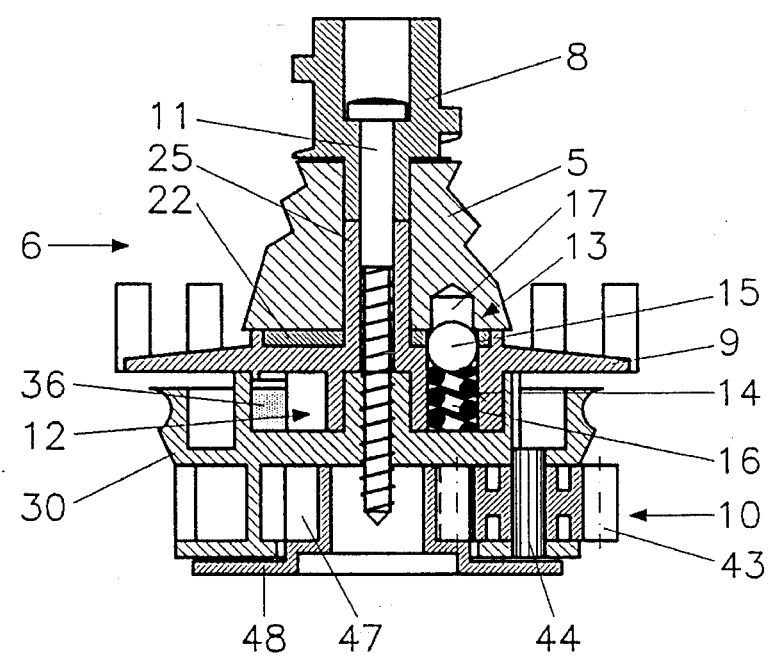
FIG. 2 shows a longitudinal sectional view of grinding rotor unit, also showing the grinding tool, the delivery dish member and a part of the gear box assembly.
Figure 3:
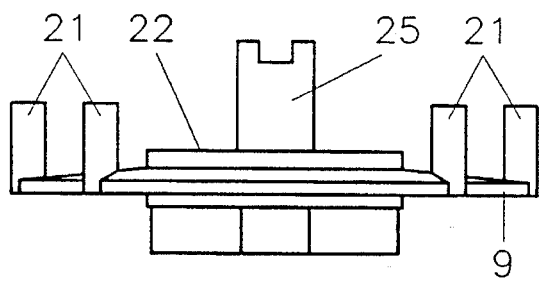
FIG. 3 shows a side view of the delivery dish member.
Figure 6:
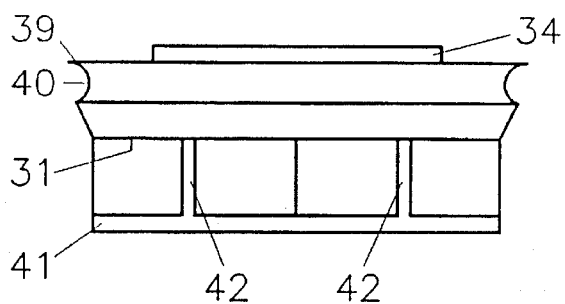
FIG. 6 shows a side view of the gear box assembly.
Figure 4:
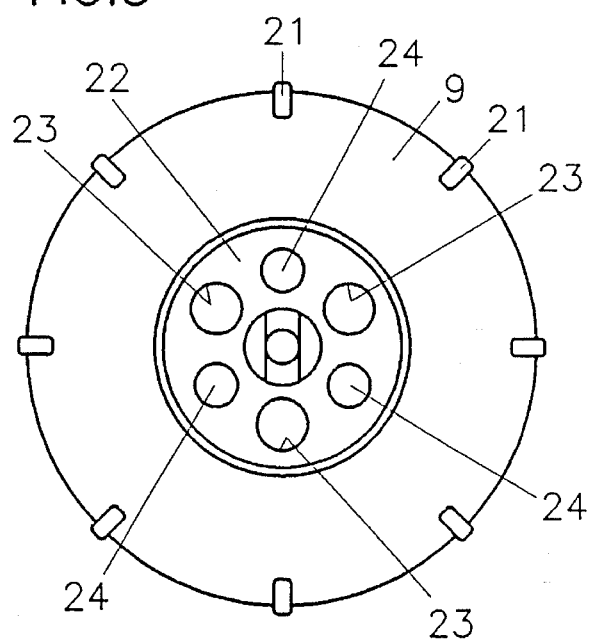
FIG. 4 shows a top view of the delivery dish member.
Figure 7:
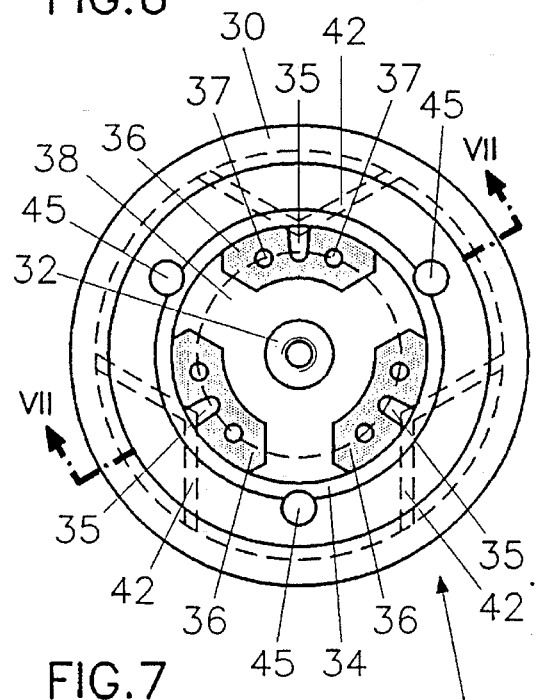
FIG. 7 shows a top view of the gear box assembly.
Figure 5:
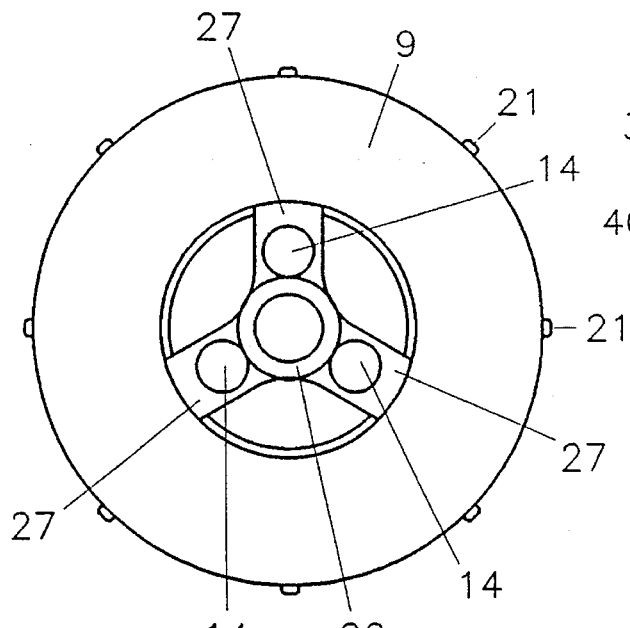
FIG. 5 shows a bottom view of the delivery dish member.
Figure 8:
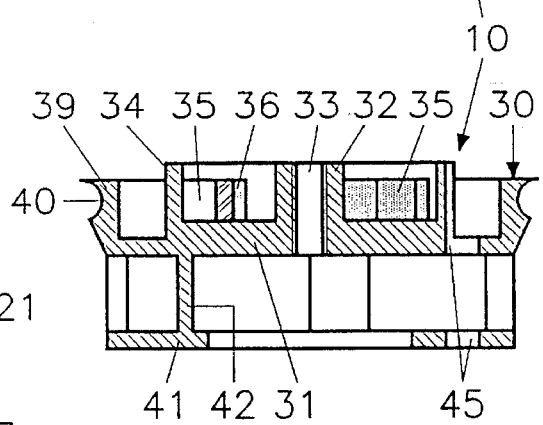
FIG. 8 shows a longitudinal sectional view of a portion of the gear box assembly, taken along the line VIII—VIII in FIG. 7.

The grinding unit 6 is further provided with an integrally formed input feeding screw member 8 being effective in the interior of the funnel member 2 for the drawing in of the coffee beans, with a delivery dish member 9 and with a gear box element 10; all these parts and elements are preferably made of a suitable plastic material. As can be seen in FIG. 2, the parts and elements 5, 8, 9 and 10 are connected to each other in vertical direction by means of a central screw member 11. The connection force exerted by the central screw member 11 provides a certain, but relatively small frictional force for the torsionally fixed interconnection of the afore mentioned parts and elements 5, 8, 9 and 10. However, in the main, the transmission of the torque from the gear box element 10 to the grinding tool 5 is effected by means of a dog clutch member 12 located and effective between the gear box element 10 and the delivery dish member 9 and by means of a safety clutch member 13 which is located and effective between the delivery dish member 9 and the grinding tool 5 and moreover limiting the amount of torque transmitted between the gear box unit 10 and the grinding tool 5. The safety clutch member 13 is provided with ball members 15 located in axially running bores 14 of the delivery dish member 9 and being axially displaceable in these bores 14. The ball members 15 are forced against the front face of the grinding tool 5 and partially engage apertures 17 provided therein under the influence of spring members 16 assigned to each ball member 15.

Further gear box elements 18 and the drive shaft 19 to be connected with a driving motor member (not shown) are shown but very schematically and there is no need to further discuss the design of these parts and elements which are known per se to every person skilled in the art. As a rotation bearing for the grinding rotor member 6, a ball bearing member is provided, the balls 20 thereof being guided in the housing 1 and along the outermost portion of the gear box unit 10.

As can be seen in FIGS. 1 to 5, the delivery dish member 9, preferably made of a casting resin material, is provided with wing members 21 located along its periphery and directed upwards. The face of the delivery dish member 9 which is directed towards the grinding tool is provided with a metallic disc member 22 cast into the delivery dish member 9. In this metallic disc member 22, the mouths 23 of the afore mentioned bores 14 for the ball members 15 are located. The metallic disc member 22 is secured against rotation by means of cylindrical cast pin members 24 which project from the upper side of the delivery dish member 9 and engage matching bores in the metallic disc member 22. The conical grinding tool 5 rests on this metallic disc member 22 and is radially guided by means of a sleeve member 25 provided on the delivery dish member 9. The lower side of the delivery dish member 9 is provided with three claw members 27 which project radially from a central hub 26; the three claw members 27 cooperate with corresponding claw members provided at the gear box element 10 and simultaneously serve as support means for the ball members 15 and for the spring members 16. For this purpose, they are provided with the continuous bores 14.

As can be seen in FIGS. 1, 2 and 6 to 8, the gear box unit 10 is provided with a support body member 30 made of casting resin for a planetary gear. Above a bottom plate 31, there is provided a cylindrical pin member 32 which matches the hub 26 of the delivery dish member 9 and which is provided with a bore 33 in which the thread of the central screw member 11 is screwed in. The pin member 32 is surrounded by a cylindrical collar 34 whereby the hollow cylindrical chamber between the pin member 32 and the collar 34 receives the dog clutch member 12. Moreover, the bottom plate 31 of the support body member 30 serves for the spring members 16 of the safety clutch 12 as a stop member.

At the inner side of the collar 34, rib-shaped claw members 35 are provided which extend radially inwardly and which indirectly cooperate with the claw members 27 provided on the delivery dish member 9. Provided as intermediate members between the claw members 35 and the claw members 27 are elastic damping members 36 which are mounted on the claw members 35 and which are additionally provided with continuous axial bores 37 in order to increase their elasticity. The elastic damping members 36 are designed in an annular sector shaped configuration and arranged such that a gap 38 remains between two adjacent elastic damping members 36 in which one of the claws 27 provided on the delivery dish member 9 matchingly engages.

At an outer curb 39 of the support body member 30, a peripheral guiding groove 40 for the ball members 20 of the rotation bearing is provided. At the opposite side, i.e. opposite to the curb 39, of the support body member 30, there is provided an annular flange member 41, located in a certain distance from and parallel to the bottom plate member 31. The annular flange member 41 is connected to the bottom plate member 31 by means of three angularly shaped web members 42. Located between the bottom plate member 31 and the annular flange member 41 is the planetary gear.

Three planet wheels 43 are arranged between the web members 42 and rotate about axes 44 which are provided in flushing bores 45 (cf. FIGS. 7 and 8) of the bottom plate member 31 and the annular flange member 41, respectively. The planet wheels 43 mesh, as can be seen in FIG. 1, with a ring gear member 46 connected to or integrally formed with the housing 1. The sun gear member 47 (cf. FIG. 2) is provided with a flange member 48 to which are connected further elements of the driving means, not shown in the drawing.

What is claimed is:

1. A grinding unit for a coffee grinding apparatus, particularly for the use in a coffee brewing machine, comprising:

a conically shaped grinding tool member;

a grinding collar member, said grinding tool member being rotatably mounted in the interior of said grounding collar member;

a driving means incorporating a gear means for driving said grinding tool member to a rotational movement around a vertically running axis;

a delivery dish member axially connected to said grinding tool member and to said gear means;

a dog clutch means operationally inserted between said gear means and said delivery dish member;

a safety clutch means operationally inserted between said delivery dish member and said grinding tool member, said safety clutch means being adapted to limit the amount of torque transmitted between said delivery dish member and said grinding tool member;

said safety clutch member comprising a plurality of ball members located in axial bores provided in said delivery dish member and being under the pressure of spring means, said ball members partially engaging apertures provided in the front face of said grinding tool member;

said delivery dish member and said gear means being made of plastic material;

said delivery dish member being provided at its surface which faces said grinding tool member with a metallic disc member in which are located the mouths of axially running bores containing said spring pressure loaded ball members; and said dog clutch means comprising a plurality of elastical dampening means inserted between the claw members of said dog clutch means.

2. A grinding unit according to claim 1 in which said metallic disc member is torsionally fixedly cast into said delivery dish member.

3. A grinding unit according to claim 1 in which said gear means is provided with a plurality of rib-like radial claw means at that side which faces said delivery dish member, each of said claw means being provided with one of said elastic dampening means.

4. A grinding unit according to claim 3 in which said dampening means are constituted by annular sector shaped damper body members and are mounted such that the distance between two parallel end sides of adjacent damper body members delimited a gap in which a claw member of said delivery dish member matchingly engages.

5. A grinding unit according to claim 4 in which said damper body members are provided with continuous axial bores in order to increase their elasticity.

6. A grinding unit according to claim 1 in which said grinding tool member, said delivery dish member, said gear means as well as a coffee beans feeding screw member are constructionally integrated into a grinding rotor member.

* * * * *